US012771800B2

(12) United States Patent
Nishimori

(10) Patent No.: US 12,771,800 B2
(45) Date of Patent: Oct. 20, 2026

(54) IMAGE PROCESSING METHOD, IMAGE PROCESSING SYSTEM, AND NON-TRANSITORY COMPUTER-READABLE STORAGE MEDIUM STORING PROGRAM

(71) Applicant: SEIKO EPSON CORPORATION, Tokyo (JP)

(72) Inventor: Takashi Nishimori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 279 days.

(21) Appl. No.: 18/488,189

(22) Filed: Oct. 17, 2023

(65) Prior Publication Data

US 2024/0129423 A1 Apr. 18, 2024

(30) Foreign Application Priority Data

Oct. 17, 2022 (JP) ................................ 2022-166060

(51) Int. Cl.

| | |
|---|---|
| ***H04N 1/60*** | (2006.01) |
| ***G06V 10/44*** | (2022.01) |
| ***G06V 10/56*** | (2022.01) |
| ***G06V 10/60*** | (2022.01) |
| ***H04N 5/74*** | (2006.01) |

(52) U.S. Cl.

CPC ............... *H04N 1/60* (2013.01); *G06V 10/44* (2022.01); *G06V 10/56* (2022.01); *G06V 10/60* (2022.01); *H04N 5/74* (2013.01)

(58) Field of Classification Search

CPC ............ H04N 1/60; H04N 5/74; G06V 10/56; G06V 10/60; G06V 10/44

See application file for complete search history.

(56) References Cited

U.S. PATENT DOCUMENTS

2021/0377501 A1* 12/2021 Tu ........................ H04N 9/3147

FOREIGN PATENT DOCUMENTS

| | | | | | |
|---|---|---|---|---|---|
| JP | 2007-322671 A | | 12/2007 | | |
| JP | 2011-048773 A | | 3/2011 | | |
| JP | 2013020093 A | * | 1/2013 | | |
| JP | 2013-109239 A | | 6/2013 | | |
| JP | 2014-060611 A | | 4/2014 | | |
| JP | 2016-212357 A | | 12/2016 | | |
| JP | 2020127162 A | * | 8/2020 | | H04N 5/74 |
| JP | 2021-048470 A | | 3/2021 | | |

* cited by examiner

*Primary Examiner* — Wednel Cadeau

(74) *Attorney, Agent, or Firm* — Dority & Manning, P.A.

(57) ABSTRACT

An image processing method according to an aspect of the present disclosure includes acquiring a captured image containing a projection image projected onto a projection surface from an optical apparatus based on an image signal and a plurality of feature points located in a region outside a region where the projection image is displayed on the projection surface by capturing an image of the projection surface, and correcting color or luminance of the projection image based on the captured image.

20 Claims, 3 Drawing Sheets

IMAGE PROCESSING METHOD, IMAGE PROCESSING SYSTEM, AND NON-TRANSITORY COMPUTER-READABLE STORAGE MEDIUM STORING PROGRAM

The present application is based on, and claims priority from JP Application Serial Number 2022-166060, filed Oct. 17, 2022, the disclosure of which is hereby incorporated by reference herein in its entirety.

BACKGROUND

1. Technical Field

The present disclosure relates to an image processing method, an image processing system, and non-transitory computer-readable storage medium storing a program.

2. Related Art

An example of related art for detecting the position of an image or a video displayed on a projection surface may include the technology disclosed in JP-A-2020-127162. In JP-A-2020-127162, markers are superimposed on the four corners of a video, and the coordinates of the corners on the projection surface are calculated based on a captured image of the projection surface on which the video with the markers superimposed on the corners is displayed.

JP-A-2020-127162 is an example of the related art.

When the markers are superimposed on the projection image for correction thereof, the superimposition of the markers lowers the quality of the projection image during the period for which the markers are displayed, as compared with the image quality achieved when no markers are displayed.

SUMMARY

An image processing method according to an aspect of the present disclosure includes acquiring a captured image containing a projection image projected onto a projection surface from an optical apparatus based on an image signal and a plurality of feature points located in a region outside a region where the projection image is displayed on the projection surface by capturing an image of the projection surface, and correcting color or luminance of the projection image based on the captured image.

An image processing system according to another aspect of the present disclosure includes a processing apparatus, and the processing apparatus acquires a captured image containing a projection image projected onto a projection surface from an optical apparatus based on an image signal and a plurality of feature points located in a region outside a region where the projection image is displayed on the projection surface by capturing an image of the projection surface, and corrects color or luminance of the projection image based on the captured image.

A non-transitory computer-readable storage medium storing a program according to another aspect of the present disclosure, the program causing a computer to acquire a captured image containing a projection image projected onto a projection surface from an optical apparatus based on an image signal and a plurality of feature points located in a region outside a region where the projection image is displayed on the projection surface by capturing an image of the projection surface, and correct color or luminance of the projection image based on the captured image.

DESCRIPTION OF EMBODIMENTS

A variety of technically preferable restrictions are imposed on the embodiment described below. The embodiment of the present disclosure is, however, not limited to the form described below.

A: Embodiment

Figure 1:
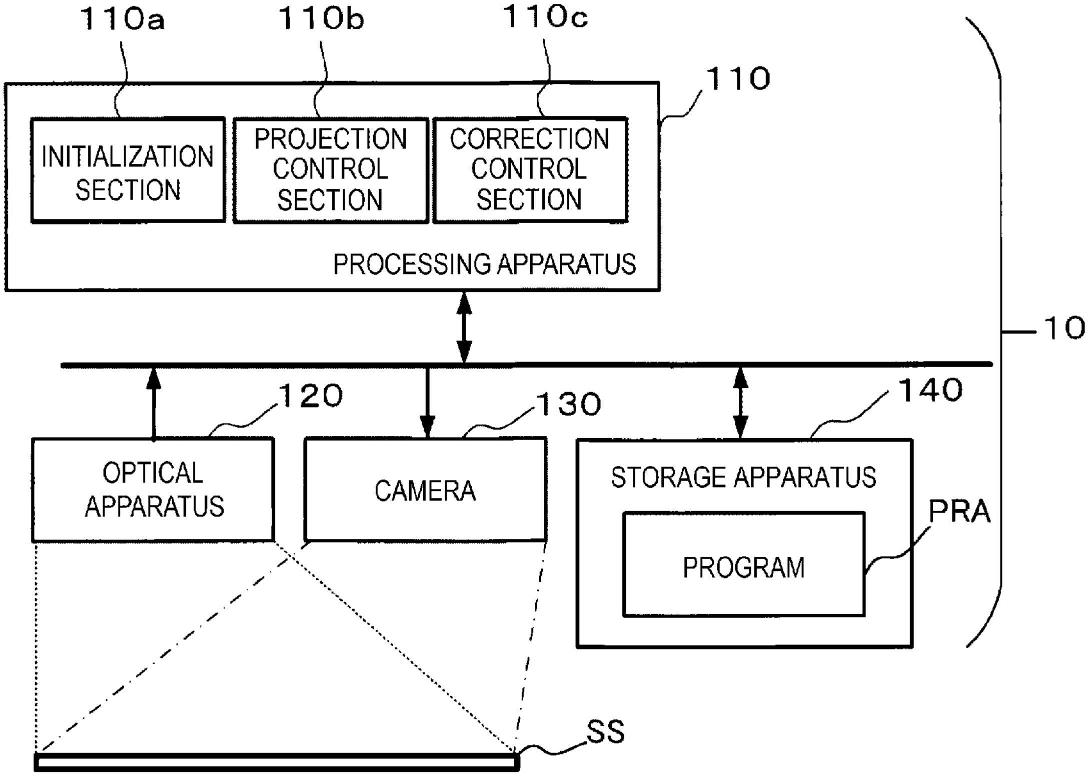
FIG. 1 shows an example of the configuration of a projector of an image processing system according to an embodiment of the present disclosure.
Figure 2:
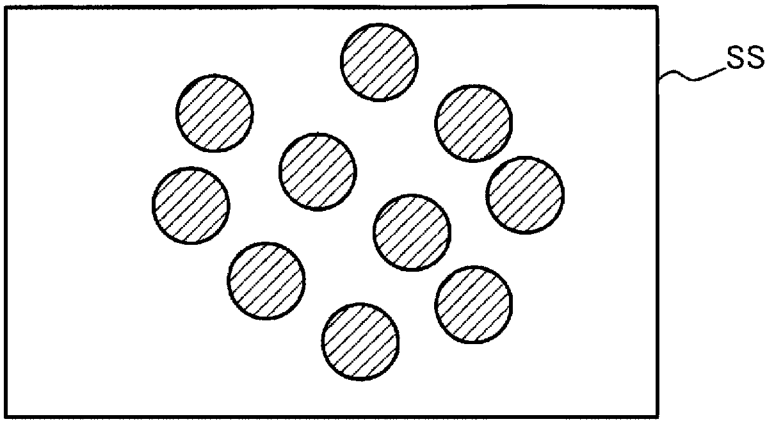
FIG. 2 shows an example of a projection surface onto which an image is projected from the projector.

FIG. 1 shows an example of the configuration of a projector 10, which executes an image processing method according to an embodiment of the present disclosure. An image supplier that is not shown is connected to the projector 10 via a wire or wirelessly. The projector 10 projects an image indicated by an image signal supplied from the image supplier onto a projection surface SS. A specific example of the image supplier may be a personal computer. The projection surface SS in the present embodiment is a wall surface of a room in which the projector 10 is installed. Unlike a projection screen, a variety of patterns are drawn in a variety of colors on the projection surface SS. FIG. 2 shows an example of the projection surface SS. On the projection surface SS shown in FIG. 2, for example, a polka dot pattern is drawn on a white background with the color of the pattern being different from white, such as light blue. The oblique hatching in FIG. 2 represents a color different from white.

The projector 10 includes a processing apparatus 110, an optical apparatus 120, a camera 130, and a storage apparatus 140, as shown in FIG. 1. The projector 10 includes, in addition to the processing apparatus 110, the optical apparatus 120, the camera 130, and the storage apparatus 140, a communication apparatus that communicates with the image supplier via a wire or wirelessly, and an input apparatus that accepts a variety of types of input operation performed by a user, such as a keyboard. The communication apparatus and the input apparatus are, however, not shown in FIG. 1 because they are less relevant to the present disclosure.

The processing apparatus 110 includes, for example, a processor, such as a CPU (central processing unit), that is, a computer. The processing apparatus 110 may be formed of a single processor or a plurality of processors. The processing apparatus 110 functions as a control center of the projector 10 by operating in accordance with a program PRA stored in the storage apparatus 140.

The optical apparatus 120 includes a projection lens, a liquid crystal driver, a liquid crystal panel, and a light source section. In FIG. 1, the projection lens, the liquid crystal driver, the liquid crystal panel, and the light source section are omitted. The liquid crystal driver drives the liquid crystal panel in accordance with an image signal supplied from the processing apparatus 110 to draw an image indicated by the image signal on the liquid crystal panel. The light source section includes, for example, a light source such as a halogen lamp or a laser diode. Light from the light source section is modulated on a pixel basis by the liquid crystal panel, and the modulated light is projected as image light via the projection lens. The image light projected onto the projection surface SS displays the image on the projection surface SS. Note that the optical apparatus 120 only needs to be configured to project the image light onto the projection surface SS, and may instead be configured to include a digital mirror device (DMD) in place of the liquid crystal driver and the liquid crystal panel.

Figure 3:
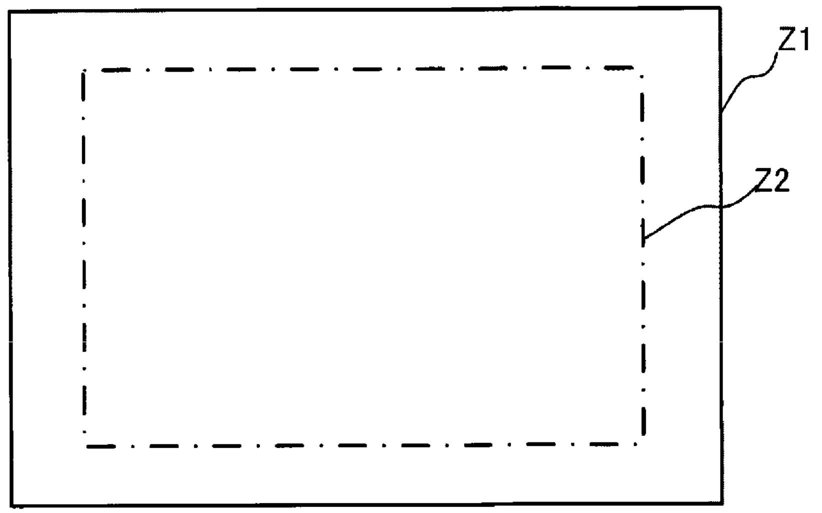
FIG. 3 shows the relationship between a display region and an adjustment region of a projection surface.

In the present embodiment, an image signal representing a largest image that can be projected by the optical apparatus 120 is supplied from the image supplier to the projector 10, while the optical apparatus 120 projects an image smaller than the image indicated by the image signal onto the projection surface SS under the control of the processing apparatus 110. For example, when the contour of the largest image that can be projected by the optical apparatus 120 is expressed by a frame Z1, the optical apparatus 120 reduces the image indicated by the image signal supplied from the image supplier to an image having a contour expressed by a frame Z2 and projects the reduced image onto the projection surface SS, as shown in FIG. 3. Hereinafter, the region inside the frame Z2 is referred to as a display region, an image indicated by the image signal supplied from the image supplier is referred to as a processing target image, and an image projected onto the display region is referred to as a projection image. The region between the frame Z2 and the frame Z1 in the region outside the frame Z2 is referred to as an adjustment region. In the present embodiment, the optical apparatus 120 has a resolution of 1920×1080 pixels, and the resolution of the processing target image is also 1920×1080 pixels, but the resolution of the projection image, that is, the size of the display region is 1600×800 pixels. Therefore, in the present embodiment, the adjustment region provided at the left and right sides of the display region has a width of 160 pixels, and the adjustment region provided above and below the display region each has a width of 90 pixels.

The camera 130 includes, for example, a CCD (charge coupled device) or a CMOS (complementary metal oxide semiconductor) device, which is an imaging device that converts light focused thereon by an optical system, such as a lens, into an electric signal. The posture of the camera 130 has been so adjusted that the optical axis thereof passes through the center of the projection surface SS. A filter that transmits visible light is attached to the camera 130 to allow it to receive visible light. The camera 130 captures an image of the projection surface SS under the control of the processing apparatus 110. Whenever the camera 130 captures an image of the projection surface SS, the camera 130 outputs an image signal representing the captured image to the processing apparatus 110.

The storage apparatus 140 is a recording medium readable by the processing apparatus 110. The storage apparatus 140 includes, for example, a nonvolatile memory and a volatile memory. The nonvolatile memory is, for example, a ROM (read only memory), an EPROM (erasable programmable read only memory), or an EEPROM (electrically erasable programmable read only memory). The volatile memory is, for example, a RAM (random access memory). The nonvolatile memory of the storage apparatus 140 stores in advance the program PRA, which causes the processing apparatus 110 to execute the image processing method according to the present disclosure. The volatile memory of the storage apparatus 140 is used by the processing apparatus 110 as a work area when the processing apparatus 110 executes the program PRA.

The volatile memory stores conversion data for converting a position on the captured image captured with the camera 130 to a position on the liquid crystal panel in the optical apparatus 120 and vice versa, and a correction data group used to correct the colors of the image projected onto the projection surface SS. The correction data group is a collection of two-dimensional coordinates representing each position on the liquid crystal panel and correction data representing the amount of correction of each of colors R, G, and B at the position. The correction data group is specifically 3D-LUT, that is, a three-dimensional lookup table. The conversion data and the correction data group are generated by execution of calibration and stored in the volatile memory.

The calibration refers to the process of associating a camera coordinate system that specifies a position on the captured image captured with the camera 130 with a panel coordinate system that specifies a position on the liquid crystal panel of the optical apparatus 120. A specific example of the conversion data is a first conversion matrix for converting the camera coordinate system into the panel coordinate system and vice versa. The conversion data is generated, for example, by comparing a captured image produced by capturing, with the camera 130, an image of the projection surface SS on which a pattern image, such as Gaussian dots, is projected from the optical apparatus 120 with the pattern image. The positions on the projection surface SS and the positions on the liquid crystal panel are associated with each other by the conversion data.

The correction data group is generated based on 125 captured images produced by sequentially projecting 125 images in total having R, G, and B color values of (0,0,0), (0,0,64), (0,0,128) . . . (255,255,192), and (255, 255, 255) onto the display region, and capturing an image of the projection surface SS on which the images are each projected onto the display region with the camera 130. In more detail, the correction data group is generated by performing projective transformation or the like using the conversion data on each of the 125 captured images to extract a portion corresponding to the display region, and calculating the difference between the pixel values of the pixels present in the extracted portion and the pixel values of the pixels corresponding to the pixels of the liquid crystal panel. It can therefore be said that the correction data group is a collection of two-dimensional coordinates indicating each position on the display region on the projection surface SS and correction data representing the amount of correction of each of the colors R, G, and B at the position. Note that existing technologies including a color subtraction process of reducing the number of colors may be used as appropriate to generate the correction data group. Further, it is preferable that the exposure and the shutter speed of the camera 130 are fixed during the process of sequentially capturing the 125 captured images. Moreover, to remove white noise from the camera 130 and fine patterns on the projection surface SS, it is preferable that noise removal using a median filter is performed on each of the 125 captured images.

The processing apparatus 110 reads the program PRA from the nonvolatile memory into the volatile memory in response to the operation of turning on the projector 10, and starts executing the read program PRA. The processing apparatus 110 operating in accordance with the program PRA functions as an initialization section 110*a*, a projection control section 110*b*, and a correction control section 110*c* shown in FIG. 1. The initialization section 110*a*, the projection control section 110*b*, and the correction control section 110*c* shown in FIG. 1 are software modules achieved by operating the processing apparatus 110 in accordance with the program PRA. The functions of the initialization section 110*a*, the projection control section 110*b*, and the correction control section 110*c* shown in FIG. 1 are described below.

The initialization section 110*a* performs the calibration described above to generate the conversion data and the correction data group, and stores them in the volatile memory.

The projection control section 110*b* reduces a processing target image to an image having a size according to the display region, further performs color correction using the correction data group on the image, and causes the optical apparatus 120 to project the reduced and color-corrected image as the projection image.

The correction control section 110*c* detects a change in the relative positional relationship of the projector 10 with the projection surface SS in the situation in which the projection image is projected onto the projection surface SS. A change in the relative positional relationship of the projector 10 with the projection surface SS occurs, for example, when the user accidentally pushes the projector 10. The correction control section 110*c* projects a marker image representing markers corresponding to a plurality of feature points onto the adjustment region in the situation in which the projection image is projected onto the projection surface SS, and periodically executes the process of causing the camera 130 to capture an image of the projection surface SS on which the projection image and the marker image are projected. In other words, the correction control section 110*c* projects the marker image onto the adjustment region before acquiring the captured images.

Figure 4:
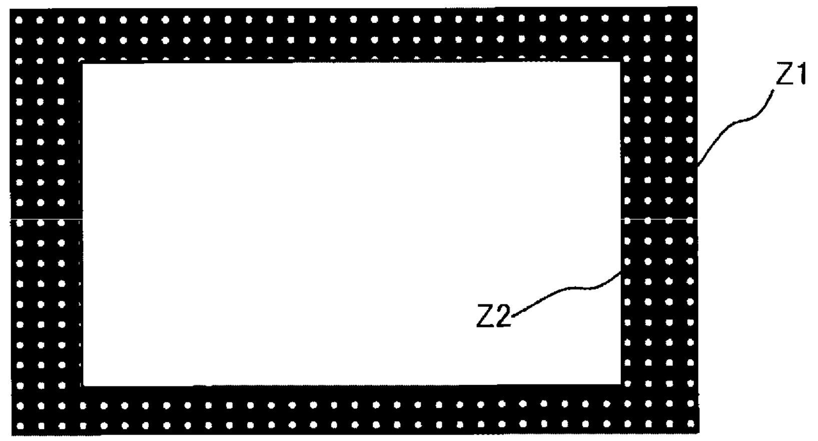
FIG. 4 shows an example of a marker image projected along with a projection image from the projector onto the projection surface.

FIG. 4 shows an example of the projection surface SS on which the projection image and the marker image are projected. The markers in the present embodiment are dots drawn in white on a black background, and the image of the pattern of the dots is the marker image, as shown in FIG. 4. Since the marker image is projected onto the adjustment region, that is, a region outside the contour of the display region, the projection image and the marker image do not overlap with each other. The correction control section 110*c* causes the camera 130 to capture an image of the projection surface SS on which the marker image is projected along with the projection image to acquire from the camera 130 an image signal representing a captured image including the projection image and an image of the plurality of feature points located in the region outside the display region.

The correction control section 110*c* detects a change in the relative positional relationship of the projector 10 with the projection surface SS based on the captured image captured with the camera 130. A change in the relative positional relationship of the projector 10 with the projection surface SS appears as a change in the ratio of the display region to the projection surface SS. The correction control section 110*c* therefore detects changes in the positions of the feature points that are present in the adjustment region of the captured image periodically captured with the camera 130 to detect a change in the relative positional relationship of the projector 10 with the projection surface SS. Specifically, the correction control section 110*c* tracks the change in the position of each of the feature points closest to the four corners of the contour of the display region to detect how much and in what direction the display region has moved from the initial position thereof.

When a change in the position of the display region is detected on the projection surface SS, the correction control section 110*c* generates a second conversion matrix that associates the position of the display region after the change with the position of the display region before the change. To detect the changes in the positions of the feature points and derive the second conversion matrix, known image registration technologies, such as scale-invariant feature transform (SIFT), speeded up robust features (SURF), and other algorithms, can be employed as appropriate.

The correction control section 110*c* then evaluates whether the amount of change in the position of the display region on the projection surface SS is smaller than a predetermined threshold, and when the amount of change is greater than or equal to the predetermined threshold, the correction control section 110*c* issues notification that prompts re-execution of the calibration. An indicator representing the amount of change in the position of the display region may be matrix elements that constitute the second conversion matrix, that is, the largest component among the components of the matrix.

Figure 5:
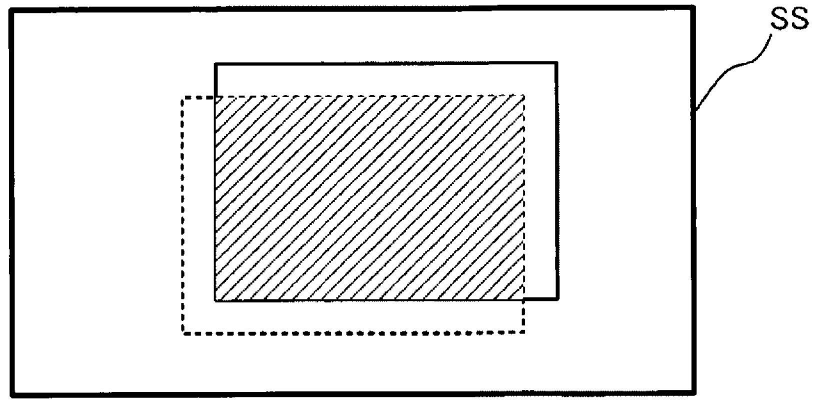
FIG. 5 describes the range of correction data used after the position of the display region has changed.

On the other hand, when the amount of change in the position of the display region on the projection surface SS is not zero but is smaller than the predetermined threshold, the correction control section 110*c* determines, out of the correction data group, the range of the correction data used to correct the colors of the image projected onto the changed display region. The projection control section 110*b* then performs the color correction using the correction data having the range determined by the correction control section 110*c*. For example, it is assumed that a change in the relative positional relationship between the projector 10 and the projection surface SS has changed the position of the display region indicated by the solid line to the position indicated by the dotted line in FIG. 5. In this case, the correction data group has already been created by the calibration for the hatched region in FIG. 5, that is, the region where the display region before the change in the position thereof overlaps with the display region after the change in the position thereof. Therefore, for the pixels of the liquid crystal panel that correspond to the overlap region, the projection control section 110*b* uses the first and second conversion matrices to determine the positions on the projection surface SS that correspond to the pixels after the position of the display region is changed, and uses correction data corresponding to the determined positions out of the created correction data to perform the color correction. In contrast, the projection control section 110*b* does not perform the color correction on the pixels outside the region where the display region before the change in the position thereof overlaps with the display region after the change in the position thereof. Note that when the amount of change in the position of the display region on the projection surface SS is greater than or equal to the predetermined threshold, re-execution of the calibration is prompted because the region where the display region before the change in the position thereof overlaps with the display region after the change in the position thereof is narrow and therefore provides only a small amount of reusable correction data.

Figure 6:
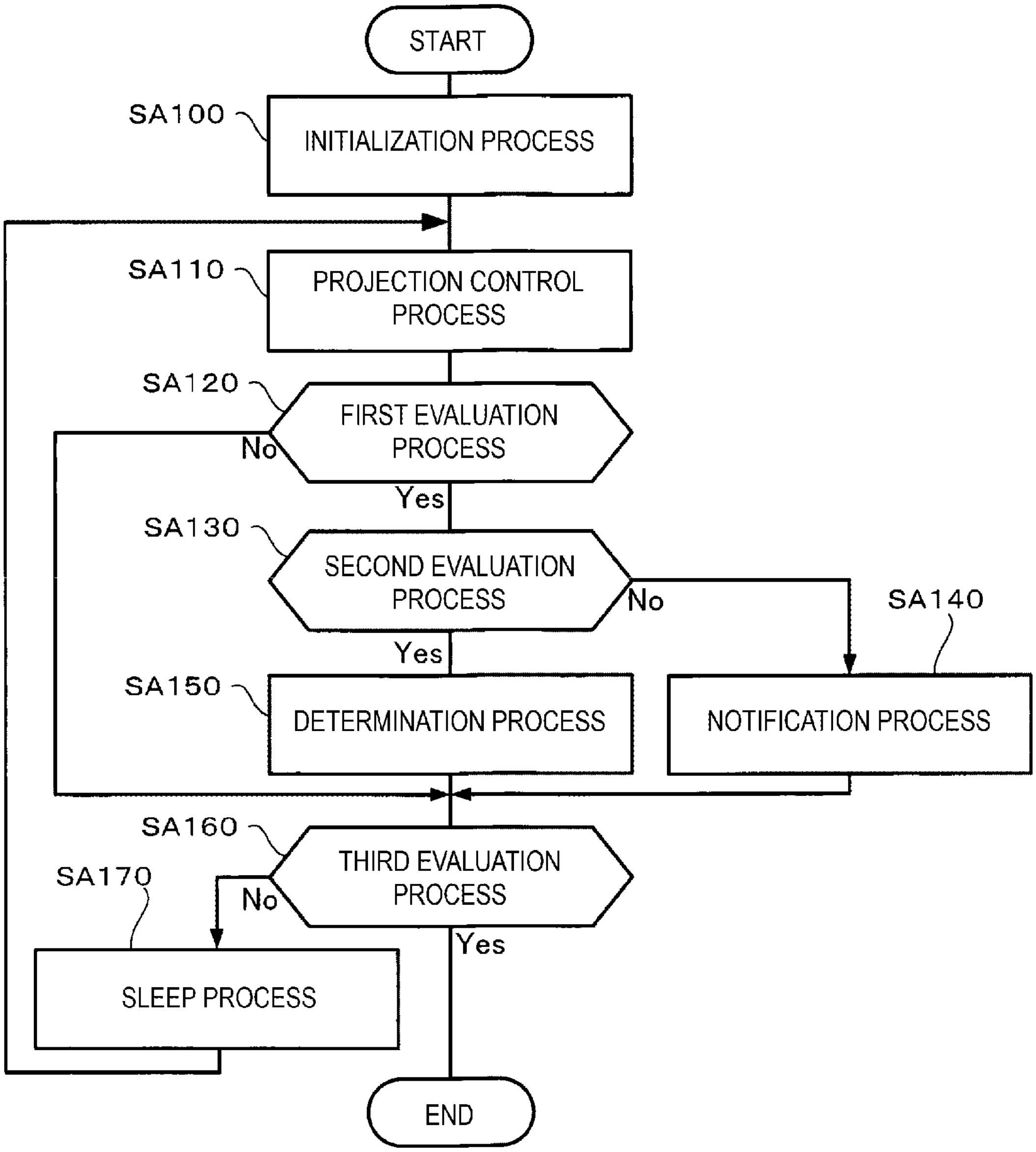
FIG. 6 is a flowchart showing the procedure of an image processing method executed by a processing apparatus of the projector in accordance with a program.

The processing apparatus 110, which operates in accordance with the program PRA, also executes the image processing method, the procedure of which is shown in the form of the flowchart of FIG. 6. The image processing method includes an initialization process SA100, a projection control process SA110, a first evaluation process SA120, a second evaluation process SA130, a notification process SA140, a determination process SA150, a third evaluation process SA160, and a sleep process SA170, as shown in FIG. 6.

In the initialization process SA100, the processing apparatus 110 functions as the initialization section 110*a*. In the initialization process SA100, the processing apparatus 110 performs the calibration described above and stores the conversion data and the correction data group in the volatile memory.

In the projection control process SA110, the processing apparatus 110 functions as the projection control section 110*b*. In the projection control process SA110, the processing apparatus 110 performs the image reduction and the color correction using the correction data group on the image signal supplied from the image supplier, supplies the resultant image signal to the optical apparatus 120, and causes the optical apparatus 120 to project the reduced and color-corrected image onto the display region.

In the first evaluation process SA120, the second evaluation process SA130, the notification process SA140, the determination process SA150, and the third evaluation process SA160, the processing apparatus 110 functions as the correction control section 110*c*. In the first evaluation process SA120, the processing apparatus 110 projects the marker image onto the adjustment region, and causes the camera 130 to capture a captured image including the marker image and the projection image to acquire the captured image. Thereafter, in the first evaluation process SA120, it is evaluated based on the captured image whether the position of the display region has changed on the projection surface SS.

When the result of the evaluation performed in the first evaluation process SA120 is "No", that is, when it is determined that the position of the display region has not changed on the projection surface SS, the processing apparatus 110 executes the third evaluation process SA160. In third evaluation process SA160, the processing apparatus 110 evaluates whether input operation that instructs termination of the projection has been performed. When the result of the evaluation performed in the third evaluation process SA160 is "Yes", that is, when it is determined that the input operation that instructs termination of the projection has been performed, the processing apparatus 110 terminates execution of the image processing method according to the present embodiment, and terminates the projection of the image onto the projection surface SS. When the result of the evaluation performed in the third evaluation process SA160 is "No", that is, when it is determined that input operation that instructs termination of the projection has not been performed, the processing apparatus 110 executes the sleep process SA170. In the sleep process SA170, the processing apparatus 110 sleeps for a fixed period of time, for example, several milliseconds, that is, lies dormant. After the execution of the sleep process SA170 is completed, the processing apparatus 110 re-executes the projection control process SA110 and the following processes.

When the result of the evaluation performed in the first evaluation process SA120 is "Yes", that is, when it is determined that the position of the display region has changed on the projection surface SS, the processing apparatus 110 executes the second evaluation process SA130. In the second evaluation process SA130, the processing apparatus 110 evaluates whether the amount of change in the position of the display region on the projection surface SS is smaller than the predetermined threshold. When the result of the evaluation performed in the second evaluation process SA130 is "No", that is, when it is determined that the amount of change in the position of the display region on the projection surface SS is greater than or equal to the predetermined threshold, the processing apparatus 110 executes the notification process SA140. In the notification process SA140, the processing apparatus 110 issues notification that prompts re-execution of the calibration. After completing the execution of the notification process SA140, the processing apparatus 110 executes the third evaluation process SA160 described above.

When the result of the evaluation performed in the second evaluation process SA130 is "Yes", that is, when it is determined that the amount of change in the position of the display region on the projection surface SS is smaller than the predetermined threshold, the processing apparatus 110 executes the determination process SA150. In the determination process SA150, the processing apparatus 110 determines, out of the correction data group, the range of the correction data used to correct the colors of an image projected onto the changed display region. After completing the execution of the determination process SA150, the processing apparatus 110 executes the third evaluation process SA160. As described above, when the result of the evaluation performed in the third evaluation process SA160 is "Yes", that is, when it is determined that input operation that instructs termination of the projection has been performed, the processing apparatus 110 terminates execution of the image processing method according to the present embodiment, and terminates the projection of the image onto the projection surface SS. When the result of the evaluation performed in the third evaluation process SA160 is "No", that is, when it is determined that input operation that instructs termination of the projection has not been performed, the processing apparatus 110 executes the sleep process SA170, and after completing the execution of the sleep process SA170, the processing apparatus 110 re-executes the projection control process SA110 and the following processes. In the projection control process SA110 executed after the determination process SA150 is executed, the color correction is performed by using the correction data in the range determined in the determination process SA150.

As described above, according to the present embodiment, in which the marker image for detecting the relative positional relationship between the projection surface SS and the projector 10 does not overlap with the projection image, the colors of the projection image projected onto a colored or patterned projection surface can be corrected when the positional relationship changes without degradation of the quality of the projection image. In addition, according to the present embodiment, even when the relative positional relationship of the projector 10 with the projection surface SS changes, the color of the projection image can be corrected without performing calibration again as long as the amount of change is very small.

B: Variations

The embodiment described above can be changed as follows.

(1) The correction data group in the embodiment described above is a collection of two-dimensional coordinates indicating each position on the projection surface SS and correction data representing the amount of correction of each of the colors R, G, and B at the position. The correction data group in the present disclosure may instead be a collection of two-dimensional coordinates indicating each position on the projection surface SS and correction data representing the amount of correction of the luminance of the pixel displayed at the position. The correction data group may still instead be a collection of correction data representing the amount of color correction and correction data representing the amount of luminance correction. In short, in the image processing method according to the present disclosure, the color or luminance of the projection image may be corrected based on a captured image including a projection image projected onto the projection surface SS from the optical apparatus 120 based on an image signal and a plurality of feature points located in the adjustment region outside the display region. In addition to the marker image, an image of a pattern for color correction may be projected onto the adjustment region.

(2) For example, when the image displayed in the display region and the marker image displayed in the adjustment region are far apart from each other in terms of color or luminance, as in a case where a marker image having a strong reddish tinge is displayed in the adjustment region in a situation in which an image having a strong bluish tinge is projected onto the display region, the viewer feels uncomfortable in some cases. To avoid the situation in which the viewer feels uncomfortable, a histogram of the color or luminance of the entire image projected onto the display region or a portion near the outer circumference of the image may be acquired, and the marker image may be projected at a timing when the difference from the histogram for the marker image becomes smaller than a predetermined threshold. Instead, out of a plurality of marker images having colors different from each other, a marker image in which a difference between the histogram of the color or luminance of the image described above and the histogram of the color or luminance of the marker image is smaller than the predetermined threshold may be used to project the marker image.

(3) The size of the image indicated by the image signal output from the image supplier to the projector 10 may be smaller than the largest size of the image that the optical apparatus 120 can project onto the projection surface SS. Furthermore, a non-display region generated in a WARP process, such as keystone correction, may be regarded as the adjustment region. Moreover, in the embodiment described above, the adjustment region is always provided, and the adjustment region may not be provided by default but may be provided when the user instructs detection of the relative positional relationship with the surface SS, as in an L-letter-shaped screen used, for example, for television broadcasting to display a quick report of election results or disaster information.

(4) In the embodiment described above, the processing apparatus 110 causes the optical apparatus 120 to project the marker image along with the projection image. Instead, the markers for extracting feature points may be disposed in advance on the projection surface SS, for example, by attaching the markers onto the projection surface SS, or a pattern drawn on the projection surface SS may be used as the markers. When markers are provided in advance on the projection surface SS, projection of the marker image from the projector 10 onto the projection surface SS can be omitted. That is, the projection of the marker image is not an essential element of the image processing method according to the present disclosure and can be omitted.

(5) The camera 130 is provided in the projector 10 in the embodiment described above, and the camera 130 may not be provided in the projector 10 and may be a component separate therefrom. The optical apparatus 120 may also be a component separate from the processing apparatus 110. In short, the present disclosure is applicable to any image processing system including the optical apparatus 120, which projects an image onto the projection surface SS, the camera 130, which captures an image of the projection surface SS, and the processing apparatus 110, which controls the actions of the optical apparatus 120 and the camera 130.

(6) In the embodiment described above, the optical apparatus that projects the marker image onto the adjustment region and the optical apparatus that projects the projection image onto the display region are combined into a single common optical apparatus, and may instead be separate optical apparatuses. In this case, since it is necessary to change the position where the optical apparatus projects the marker image onto the adjustment region in synchronization with the shift of the display region, it is necessary that the optical apparatus is fixed to the main body of the projector and does not interfere with the display region. It is further necessary to move the position where the optical apparatus projects the marker image onto the adjustment region in accordance with the user's operation, such as enlargement or reduction of the projection image or the lens shift operation, in addition to the shift of the main body of the projector. When these conditions are satisfied, it is not always necessary to track the feature points near the display region, and a certain degree of position correction can be made by illuminating any point on the projection surface SS with light or capturing an image of such a point.

(7) The initialization section 110*a*, the projection control section 110*b*, and the correction control section 110*c* in the embodiment described above are software modules. One or more or all of the initialization section 110*a*, the projection control section 110*b*, and the correction control section 110*c* may instead each be a hardware module such as an ASIC (application specific integrated circuit). Even when one or more or all of the initialization section 110*a*, the projection control section 110*b*, and the correction control section 110*c* are hardware modules, the same effects as those provided by the embodiment described above can be provided.

(8) The program PRA may be manufactured on a standalone basis, and may be provided for a fee or free of charge. Examples of a specific aspect of providing the program PRA may include an aspect of providing the program PRA written onto a computer readable recording medium, such as a flash ROM, or an aspect of providing the program PRA through downloading via an electric communication line, such as the Internet. Operating a general computer in accordance with the program PRA provided by any of the aspects allows the computer to execute the image processing method according to the present disclosure.

C: Summary of Present Disclosure

The present disclosure is not limited to the embodiment or variations described above and can be achieved in a variety of aspects to the extent that they do not depart from the intent of the present disclosure. For example, the present disclosure can be achieved by the aspects below. The technical features in the embodiment described above that correspond to the technical features in the aspects described below can be replaced by or combined with other technical features as appropriate to solve part or entirety of the problem in the present disclosure or achieve part or entirety of the effects of the present disclosure. Furthermore, when any of the technical features has not been described as an essential feature in the present specification, the technical feature can be deleted as appropriate.

The present disclosure will be summarized below as additional remarks.

Additional Remark 1

An image processing method according to an aspect of the present disclosure includes acquiring a captured image containing a projection image projected onto a projection surface from an optical apparatus based on an image signal and a plurality of feature points located in a region outside the region where the projection image is displayed on the projection surface by capturing an image of the projection surface, and correcting the color or luminance of the projection image based on the captured image. According to the image processing method described in (Additional remark 1), the color or luminance of the projection image is corrected based on the plurality of feature points located in the region outside the region where the projection image is displayed on the projection surface, so that it is not necessary to display markers corresponding to the feature points in the region where the projection image is displayed, and the quality of the projection image does not deteriorate even during the period for which the markers are displayed as compared with a case where no markers are displayed.

Additional Remark 2

The image processing method according to a more preferable aspect is the image processing method described in (Additional remark 1) in which correcting the color or luminance of the projection image includes determining a range of coordinates used to correct the color of the projection image out of correction data expressed by two-dimensional coordinates used to correct the color of the projection image based on the position of the region corresponding to the projection image in the captured image, and correcting the color of the projection image by using the correction data that falls within the range. According to the image processing method described in (Additional remark 2), the range of coordinates used to correct the color of the projection image out of the correction data expressed by two-dimensional coordinates used to correct the color of the projection image can be determined based on the position of the region corresponding to the projection image in the captured image, and the color of the projection image can be corrected by using correction data that falls within the range.

Additional Remark 3

The image processing method according to another preferable aspect is the image processing method described in (Additional remark 1) in which the projection surface has markers corresponding to the plurality of feature points. According to the image processing method described in (Additional remark 3), the color or luminance of the projection image can be corrected based on the markers corresponding to the plurality of feature points even during the period for which the markers are displayed without a decrease in the quality of the projection image as compared with the case where no markers are displayed.

Additional Remark 4

The image processing method according to still another preferable aspect is the image processing method described in (Additional remark 3) in which the size of the projection image is smaller than the size of a largest image that the optical apparatus can project onto the projection surface, and the method further includes, before acquiring the captured image, projecting a marker image representing the markers from the optical apparatus in the region between the contour of the largest image and the contour of the projection image. The image processing method according to (Additional remark 4) allows correction of the color or luminance of the projection image based on the marker image displayed between the contour of the largest image that the optical apparatus can project onto the projection surface and the contour of the projection image.

Additional Remark 5

The image processing method according to still another preferable aspect is the image processing method described in (Additional remark 3) in which the size of the projection image is smaller than the size of an image indicated by the image signal, and the method further includes, before acquiring the captured image, projecting a marker image representing the markers from the optical apparatus in the region between the contour of the image having the size indicated by the image signal and the contour of the projection image. The image processing method according to (Additional remark 5) allows correction of the color or luminance of the projection image based on the marker image displayed between the contour of the image having the size indicated by the image signal and the contour of the projection image.

Additional Remark 6

The image processing method according to a still further preferable aspect is the image processing method described in (Additional remark 3) or (Additional remark 4) in which the projection image and the marker image do not overlap with each other. According to the image processing method described in (Additional remark 6), in which the projection image and the marker image do not overlap with each other, the color or luminance of the projection image can be corrected based on the marker image even during the period for which the marker image is displayed without a decrease in the quality of the projection image as compared with the case where no marker image is displayed.

Additional Remark 7

The image processing method according to a still further preferable aspect is the image processing method described in any one of (Additional remark 1) to (Additional remark 6) in which the method further includes projecting an image of a pattern for color correction from the optical apparatus onto a region outside the projection image on the projection surface. According to the image processing method described in (Additional remark 7), a plurality of feature points are extracted from the image of the color correction pattern projected from the optical apparatus onto a region outside the projection image on the projection surface, and the color or luminance of the projection image can be corrected based on the plurality of feature points.

Additional Remark 8

An image processing system according to an aspect of the present disclosure includes a processing apparatus, and the processing apparatus acquires a captured image containing a projection image projected onto a projection surface from an optical apparatus based on an image signal and a plurality of feature points located in a region outside the region where the projection image is displayed on the projection surface by capturing an image of the projection surface, and corrects the color or luminance of the projection image based on the captured image. According to the image processing system described in (Additional remark 8), the color or luminance of the projection image is corrected based on the plurality of feature points located in the region outside the region where the projection image is displayed on the projection surface, so that it is not necessary to display markers corresponding to the feature points in the region where the projection image is displayed, and the quality of the projection image does not deteriorate even during the period for which the markers are displayed as compared with the case where no markers are displayed, as in the image processing method described in (Additional remark 1).

Additional Remark 9

A non-transitory computer-readable storage medium storing a program according to an aspect of the present disclosure, the program causing a computer to acquire a captured image containing a projection image projected onto a projection surface from an optical apparatus based on an image signal and a plurality of feature points located in a region outside the region where the projection image is displayed on the projection surface by capturing an image of the projection surface, and correct the color or luminance of the projection image based on the captured image. According to the non-transitory computer-readable storage medium storing a program described in (Additional remark 9), the color or luminance of the projection image is corrected based on the plurality of feature points located in the region outside the region where the projection image is displayed on the projection surface, so that it is not necessary to display markers corresponding to the feature points in the region where the projection image is displayed, and the quality of the projection image does not deteriorate even during the period for which the markers are displayed as compared with the case where no markers are displayed, as in the image processing method described in (Additional remark 1).

What is claimed is:

1. An image processing method comprising:

acquiring a captured image containing a projection image projected onto a projection surface from an optical apparatus based on an image signal and a plurality of feature points located in a region outside a region where the projection image is displayed on the projection surface by capturing an image of the projection surface; and correcting color or luminance of the projection image based on detecting changes in positions of the feature points located in the region outside the region where the projection image is displayed, wherein a size of the projection image is smaller than a size of a largest image that the optical apparatus is configured to project onto the projection surface, the plurality of feature points are located in a region between a contour of the largest image and a contour of the projection image, and correcting color or luminance of the projection image includes determining, based on a position of a region corresponding to the projection image in the captured image, a range of correction data expressed by two-dimensional coordinates used to correct the color of the projection image, and correcting the color of the projection image by using the correction data that falls within the range.

2. The image processing method according to claim 1, wherein the plurality of feature points include feature points closest to four corners of a contour of the region where the projection image is displayed.

3. The image processing method according to claim 1, wherein the projection surface has markers corresponding to the plurality of feature points.

4. The image processing method according to claim 1, wherein correcting color or luminance of the projection image is performed when an amount of change in a position of the projection image is less than a threshold, and the method further comprises issuing a notification to prompt re-execution of a calibration when the amount of change in the position of the projection image is greater than or equal to the threshold.

5. The image processing method according to claim 1, further comprising projecting an image of a pattern for color correction from the optical apparatus onto a region outside the projection image on the projection surface.

6. The image processing method according to claim 3, wherein a size of the projection image is smaller than a size of a largest image that the optical apparatus is configured to project onto the projection surface, and the method further comprises, before acquiring the captured image, projecting a marker image representing the markers from the optical apparatus in a region between a contour of the largest image and a contour of the projection image.

7. The image processing method according to claim 6, wherein the projection image and the marker image do not overlap with each other.

8. An image processing system comprising:

a processing apparatus programmed to execute acquiring a captured image containing a projection image projected onto a projection surface from an optical apparatus based on an image signal and a plurality of feature points located in a region outside a region where the projection image is displayed on the projection surface by capturing an image of the projection surface, and correcting color or luminance of the projection image based on detecting changes in positions of the feature points located in the region outside the region where the projection image is displayed, wherein a size of the projection image is smaller than a size of a largest image that the optical apparatus is configured to project onto the projection surface, the plurality of feature points are located in a region between a contour of the largest image and a contour of the projection image, and correcting color or luminance of the projection image includes determining, based on a position of a region corresponding to the projection image in the captured image, a range of correction data expressed by two-dimensional coordinates used to correct the color of the projection image, and correcting the color of the projection image by using the correction data that falls within the range.

9. The image processing system according to claim 8, wherein the plurality of feature points include feature points closest to four corners of a contour of the region where the projection image is displayed.

10. The image processing system according to claim 8, wherein the projection surface has markers corresponding to the plurality of feature points.

11. The image processing system according to claim 8, wherein correcting color or luminance of the projection image is performed when an amount of change in a position of the projection image is less than a threshold, and the processing apparatus is further programmed to execute issuing a notification to prompt re-execution of a calibration when the amount of change in the position of the projection image is greater than or equal to the threshold.

12. The image processing system according to claim 8, wherein the processing apparatus is further programmed to execute projecting an image of a pattern for color correction from the optical apparatus onto a region outside the projection image on the projection surface.

13. The image processing system according to claim 10, wherein a size of the projection image is smaller than a size of a largest image that the optical apparatus is configured to project onto the projection surface, and the processing apparatus is further programmed to execute, before acquiring the captured image, projecting a marker image representing the markers from the optical apparatus in a region between a contour of the largest image and a contour of the projection image.

14. The image processing system according to claim 13, wherein the projection image and the marker image do not overlap with each other.

15. A non-transitory computer-readable storage medium storing a program that causes a computer to acquire a captured image containing a projection image projected onto a projection surface from an optical apparatus based on an image signal and a plurality of feature points located in a region outside a region where the projection image is displayed on the projection surface by capturing an image of the projection surface, and correct color or luminance of the projection image based on detecting changes in positions of the feature points located in the region outside the region where the projection image is displayed, wherein a size of the projection image is smaller than a size of a largest image that the optical apparatus is configured to project onto the projection surface, the plurality of feature points are located in a region between a contour of the largest image and a contour of the projection image, and correcting color or luminance of the projection image includes determining, based on a position of a region corresponding to the projection image in the captured image, a range of correction data expressed by two-dimensional coordinates used to correct the color of the projection image, and correcting the color of the projection image by using the correction data that falls within the range.

16. The non-transitory computer-readable storage medium of claim 15, wherein the plurality of feature points include feature points closest to four corners of a contour of the region where the projection image is displayed.

17. The non-transitory computer-readable storage medium of claim 15, wherein the projection surface has markers corresponding to the plurality of feature points.

18. The non-transitory computer-readable storage medium of claim 15, wherein correcting color or luminance of the projection image is performed when an amount of change in a position of the projection image is less than a threshold, and the program further causes a computer to issue a notification to prompt re-execution of a calibration when the amount of change in the position of the projection image is greater than or equal to the threshold.

19. The non-transitory computer-readable storage medium of claim 17, wherein a size of the projection image is smaller than a size of a largest image that the optical apparatus is configured to project onto the projection surface, and the program further causes a computer to, before acquiring the captured image, project a marker image representing the markers from the optical apparatus in a region between a contour of the largest image and a contour of the projection image.

20. The non-transitory computer-readable storage medium of claim 19, wherein the projection image and the marker image do not overlap with each other.

* * * * *